US012629868B2

(12) United States Patent
Rose et al.

(10) Patent No.: US 12,629,868 B2
(45) Date of Patent: May 19, 2026

(54) METHOD OF MAKING A SIMULATED AIRWAY

(71) Applicant: Safeguard Medical Holdco, LLC, Harrisburg, NC (US)

(72) Inventors: Alexandra Charlotte Rose, Thirsk (GB); Laura Grace Jordan, Pontefract (GB); Linzi Foxcroft, Wynard (GB)

(73) Assignee: SAFEGUARD MEDICAL HOLDCO, LLC, Huntersville, NC (US)

( * ) Notice: Subject to any disclaimer, the term of this patent is extended or adjusted under 35 U.S.C. 154(b) by 0 days.

(21) Appl. No.: 18/280,514

(22) PCT Filed: Aug. 25, 2023

(86) PCT No.: PCT/US2023/031157
§ 371 (c)(1),
(2) Date: Sep. 6, 2023

(87) PCT Pub. No.: WO2025/048771
PCT Pub. Date: Mar. 6, 2025

(65) Prior Publication Data
US 2025/0282085 A1 Sep. 11, 2025

(51) Int. Cl.
*B29C 41/40* (2006.01)
*G09B 23/28* (2006.01)

(52) U.S. Cl.
CPC ............ *B29C 41/40* (2013.01); *G09B 23/288* (2013.01)

(58) Field of Classification Search
CPC ...... G09B 23/34; G09B 23/288; B29C 41/00; B29C 41/40
See application file for complete search history.

(56) References Cited

U.S. PATENT DOCUMENTS

| | | | |
|---|---|---|---|
| 6,192,329 B1 | 2/2001 | Rider et al. | |
| 10,181,270 B1 | 1/2019 | Fuller | |
| 10,909,885 B2 | 2/2021 | Eichhorn et al. | |
| 2012/0077169 A1* | 3/2012 | Takeda ................. | G09B 23/288 434/267 |

(Continued)

FOREIGN PATENT DOCUMENTS

| | | |
|---|---|---|
| JP | 2007333816 A | 12/2007 |
| WO | 2022032325 | 2/2022 |

OTHER PUBLICATIONS

Weatherall, et al. "A Novel 3-Dimensional Printing Fabrication Approach for the Production of Pediatric Airway Models", Retrieved on May 16, 2023 from https://www.ncbi.nlm.nih.gov/pmc/articles/PMC8505162/.

(Continued)

*Primary Examiner* — Alison L Hindenlang
*Assistant Examiner* — Debjani Roy
(74) *Attorney, Agent, or Firm* — Corner Counsel, LLC

(57) ABSTRACT

A simulated airway for training and practicing medical procedures has an upper jaw having simulated teeth, a nasal passage, a tongue, an epiglottis, a larynx, a trachea, an esophagus, and vocal cords. Portions of the airway are reinforced with fabric. A method of making a human airway model for simulation of medical procedures includes sculpting a core for a mold from a resin material, depositing a layer of clay on the core, and placing the core in a mold. The layer of clay is removed and a polymer is injected into the mold.

12 Claims, 12 Drawing Sheets

(56) References Cited

U.S. PATENT DOCUMENTS

| | | | |
|---|---|---|---|
| 2012/0292811 A1 | 11/2012 | Masatoshi et al. | |
| 2014/0011172 A1* | 1/2014 | Lowe | G09B 23/288 |
| | | | 434/273 |
| 2016/0175621 A1* | 6/2016 | Bettles | B29C 41/22 |
| | | | 472/70 |
| 2018/0186076 A1* | 7/2018 | Backer | C08L 83/04 |
| 2021/0183269 A1* | 6/2021 | Eichhorn | G09B 23/34 |

OTHER PUBLICATIONS

Chavant NSP Soft—2 lbs. Professional Oil Based Sulfur Free Sculpting Clay; Green, Chavant [online]. Date First Available Sep. 21, 2015, retrieved from the Internet https://www.amazon.com/Chavant-NSP-SOFT-Professional-Sculpting/dp/B015NF5W54/ref=sr_1_3?keywords=Chavant&qid=1700079506&sr=8-3.

* cited by examiner

20

24

26

41

42

22

38

METHOD OF MAKING A SIMULATED AIRWAY

CROSS-REFERENCE TO RELATED APPLICATIONS

This application is a 371 national stage application of PCT No. US2023/31157, filed on Aug. 25, 2023, which application is hereby incorporated herein by reference.

TECHNICAL FIELD

The present disclosure relates to simulated training models for an airway, such as the airway of a human being, for use in medical training, and methods of making the same.

BACKGROUND

It is desirable to provide a realistic, safe simulation for training students in certain medical procedures. Cadavers can be used for this purpose, but are not always readily available and may not be suited for certain types of training. Simulated physiologic structures provide an opportunity for patients to practice in a realistic simulation and can result in better treatment for patients ultimately. The procedures can relate to diagnosis of a condition or include procedures for life-saving emergency care. Examples include intubation of a human patient's airway, CPR, other resuscitation, and other procedures. These procedures may be performed where the patient has experienced trauma, and practiced medical personnel are required to perform under stressful situations. It may also be desirable to provide manikins which have some variations in anatomy, as this will present itself in real-world situations. It is important to emulate certain physiological structures so that the student can learn to identify important structures in the human body. It is also helpful to develop methods of making these simulated structures so that they can be replaced or re-made in an efficient manner.

SUMMARY

In aspects, a method of making a simulated airway comprises sculpting a core from a resin to approximate a shape of an interior surface of an airway, the shape of the interior surface of the airway including a nasal passage, a larynx, and an epiglottis. A layer of clay is deposited on the core, the core is then used to create a mold, and the layer of clay is removed. A polymer is injected into the mold and the polymer is cured. At least an upper portion of the nasal passage and a portion of the tongue are reinforced with a fabric. The simulated airway is removed from the core, and vocal cords are illustrated inside the simulated airway.

The core may be sculpted to include the shape of a larynx. The core may be sculpted to include the shape of an epiglottis.

The core can be sculpted to include the shape of the tongue.

The core can be sculpted to include the shape of the nasal passage.

In embodiments areas are brushed with silicone material and cured in a hot water bath.

In embodiments, a set of teeth may be attached. In certain embodiments, the set of teeth are attached before injecting the polymer.

The clay may be an oil-based clay. The clay may be removed by melting.

A simulated nasal passage may be attached. Simulated teeth may be attached to the core before placing the core in the mold.

The fabric may be applied while the airway remains on the core. The molded airway may be removed from the core before the vocal cords are depicted.

In aspects, a simulated airway for training and practicing medical procedures comprises an upper jaw having simulated teeth, a nasal passage, a tongue, an epiglottis, a larynx, a trachea, an esophagus, and vocal cords, the tongue, epiglottis and trachea being integrally molded.

The vocal cords may be painted. Portions of at least one of the nasal passage, the epiglottis, and the tongue may be reinforced with fabric.

In a further aspect, a core for an injection molding apparatus comprises at least a first part and a second part, the first part being removably attached to the second part, the first part having the shape of an upper jaw and larynx, the second part having the shape of a trachea.

In embodiments, at least one of the first part and the second part is sculpted from a polymeric material. For example, the polymeric material is curable. The polymeric material may be a resin.

In embodiments, the polymeric material is sculpted by hand.

In embodiments, a third part of the core has a shape of a nasal passage. The third part may be removably attached to the first part.

In embodiments, the first part includes the shape of the uvula. The uvula can be filled with silicone before the core is used in molding.

In a further aspect, a method of making a simulated airway comprises sculpting a core in a shape of an interior surface of an airway including a larynx, a tongue, and an epiglottis, depositing a layer of material on the core, placing the core in a mold, removing the layer of material, introducing a polymer into the mold, and curing the polymer.

In embodiments, the polymer is silicone. The core may be sculpted from a resin.

In embodiments, the core has a shape of a trachea. The trachea, tongue, and epiglottis can be integrally formed from the polymer.

The polymer is, for example, a resin.

The method can further comprise reinforcing a portion of the tongue with fabric. The fabric is netting mesh, for example.

The tongue can be reinforced with fabric while the airway is disposed on the core.

The vocal cords can be painted.

In embodiments, the simulated airway is removed from the core.

The fabric can be brushed with silicone. The silicone can be cured in a hot water bath.

Further comprising attaching a simulated set of teeth. The simulated set of teeth can be attached to the core before the core is placed in the mold.

In embodiments, the layer of material is a layer of clay. For example, the layer of clay is sculpted to have a thicker area. In embodiments, the layer of material is removed by melting.

In embodiments, the core has more than one part. In embodiments, the core has at least two parts, at least one of the at least two parts being removable and replaceable. For example, at least one of the two parts is removably attached.

In embodiments, the core has a shape of a nasal passage. For example, part of the core has a shape of a nasal passage and is removable and replaceable.

The simulated airway may be incorporated in a manikin. For example, the simulated airway is combined with a simulated head and/or a simulated chest.

In embodiments, the uvula is filled with silicone before the core is used in molding.

BRIEF DESCRIPTION OF THE DRAWINGS

The disclosure can be more completely understood in consideration of the following detailed description of various embodiments, in connection with the accompanying drawings, which are in no way limiting, in which.

DETAILED DESCRIPTION

Figure 1:
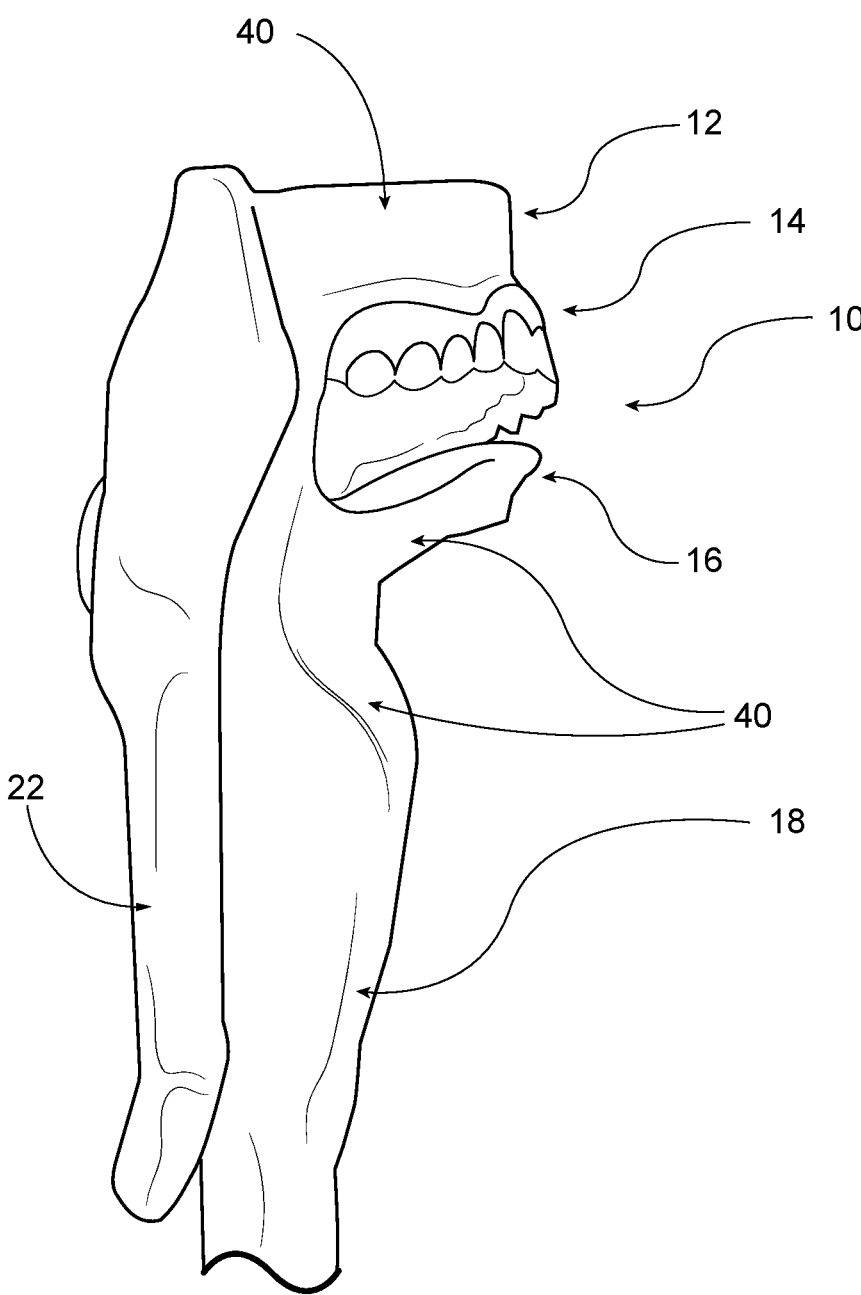
FIG. 1 is a side elevation view of a simulated airway in accordance with embodiments.

The present disclosure is directed to a simulated airway for training and practicing medical procedures, and a method of making the same. The simulated airway 10 (FIG. 1) has an upper jaw having simulated teeth 14, a nasal passage 12, a lower jaw with a tongue 16, an epiglottis, a larynx, a trachea 18, an esophagus 22, and vocal cords. Other structures, such as ligament and/or cartilage structures, can be depicted to allow someone in training to locate certain structures and distinguish the esophagus from the trachea, among other structures. In embodiments, portions of the nasal passage, epiglottis and trachea are reinforced with fabric. In embodiments, the tongue, epiglottis, and trachea are integrally formed during the molding process. A method of making a human airway model for simulation of medical procedures includes sculpting a core for a mold from a resin material, depositing a layer of clay on the core, and using the clay coated core to create a mold. The layer of clay is removed and a polymer is injected into the mold. The polymer is cured, and at least portions of the tongue 16 and a nasal passage 12 are reinforced with fabric. In embodiments, other structures are reinforced with fabric. In embodiments, the airway is de-molded and vocal cords are illustrated inside the airway. In embodiments, the structure of the vocal cords is sculpted as part of the core and clay layer, and painted or illustrated from a colored silicone or plastic material added to the molded structure. Other structures, such as ligament and/or cartilage structures can be sculpted from the core.

The simulated airway 10 is made in an insert mold having a core. The core forms the interior shape of the airway. The core is sculpted from a resin or other polymeric material. Suitable materials include those known in the sculpting or prosthetics field. For example, the core can be sculpted from polyester resin. In another example, body filler can be used. This material is used for autobody repair. Certain additives may be desirable, such as additives to adjust the curing time for the material.

Figure 2:
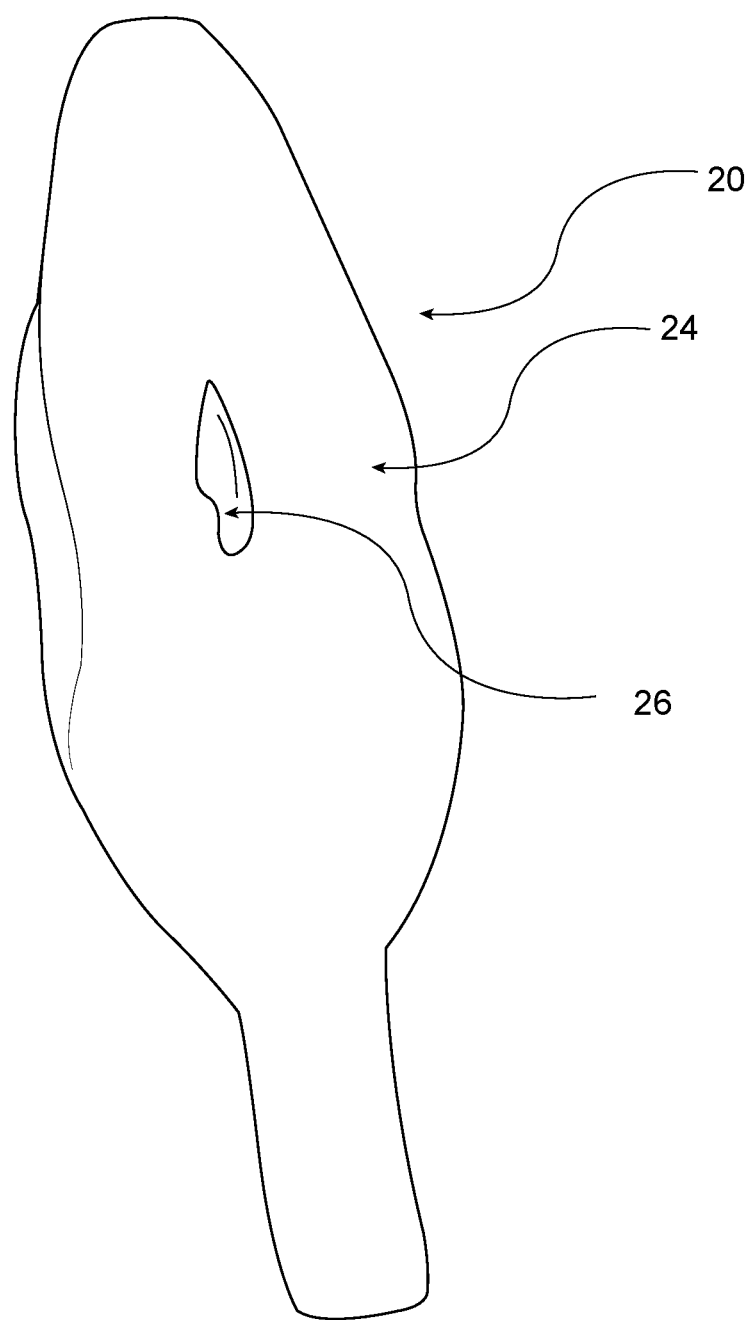
FIG. 2 is a front perspective view of sculpting material in accordance with certain embodiments.

Certain anatomical structures are desirably created in the sculpting process. Additionally or alternatively, separate components can be attached to the core and/or inserted into the mold, and molded into the airway during the molding process. A roughly shaped mass 20 of sculpting material 24 is shown in FIG. 2. FIG. 2 shows a pre-filled mass 26 for the uvula space, which is pre-filled with silicone to avoid air being trapped in that space when the core is placed in the mold and molding occurs.

In embodiments, the anatomical features are sculpted by hand. Tools may be used, such as a small drill, such as a Dremel, and sandpaper. In embodiments, a trowel, spatulas in various shapes, wire-ended loops in various shapes, and/or brush-ended tools are used. The anatomical features sculpted on the core are those that are important to identify during a medical procedure. Esophageal intubation is an example of a procedure where a simulated airway is useful for training purposes. During intubation, the epiglottis and vallecula, or the space between the epiglottis and tongue, are considered important to identify. The epiglottis is a flap of tissue that moves to protect the trachea during swallowing of food. The food must pass down the esophagus and not aspirate into the trachea and damage the lung. During intubation, the medical professional must identify and manipulate the tongue and epiglottis so that the tracheal tube passes into the trachea. During the core sculpting process, the shape of the larynx is formed. Other structures, such as ligament and/or cartilage structures can be included to help the medical professional learn how to intubate the trachea through the mouth or nasal passage, or for other procedures.

Figure 3A:
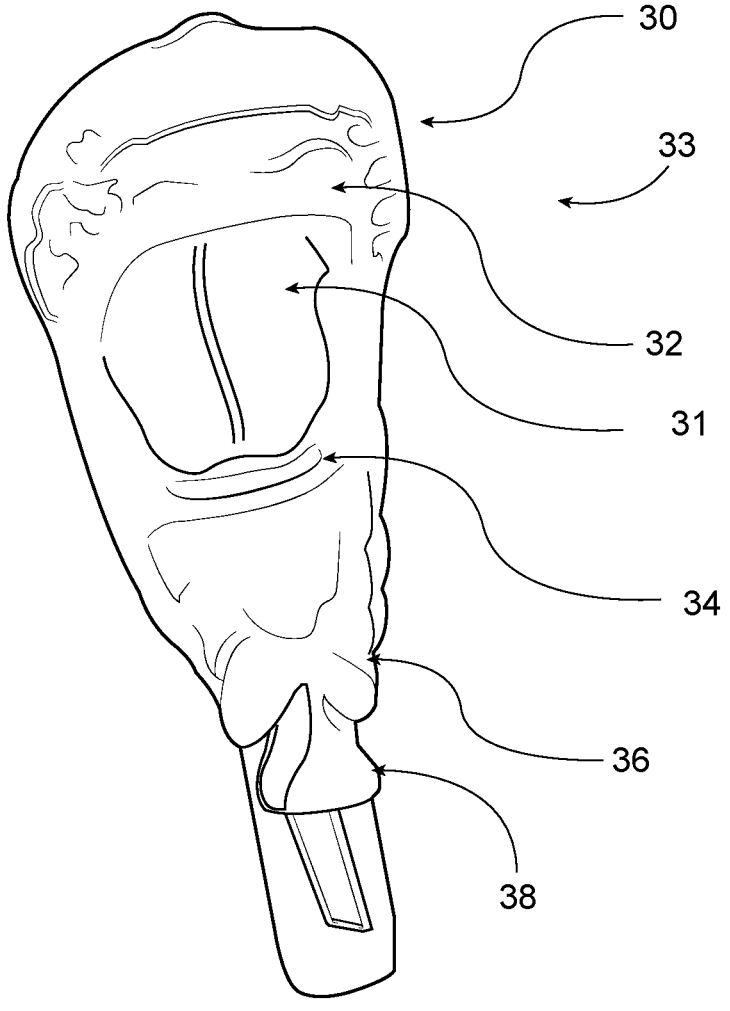
FIG. 3A is a front perspective view of a core sculpted from the sculpting material in accordance with embodiments of FIGS. 1-2.

An example of a portion of the sculpted core 30 is shown in FIG. 3A. The core has an upper jaw 32, an epiglottis 34 (or, the negative space of the epiglottis), a larynx 36, and vocal cords 38 shaped in the sculpting material 24. In embodiments, the negative space 31 for the tongue is also sculpted. The sculpting of these structures is done by hand, in certain embodiments, but may be made by machine, such as an automated robot.

In certain embodiments, the upper jaw 32 is shaped at the top of the core 30, as is visible in FIG. 3A. In certain embodiments, a simulated upper jaw 32 and teeth 14 are attached to the core 30 before molding. For example, the teeth are primed, fabric is applied, and the teeth are bonded onto the core. The teeth can be attached by adhesive. In other embodiments, a set of teeth 14 are attached after the airway is molded. In embodiments, a nasal cavity or nasal cavities 14 are formed by a separate structure attached to the core 30, or is a part of the core 30 as sculpted. In embodiments, a separate detachable nasal passage 12 is attached after the airway 10 is molded.

Figure 3B:
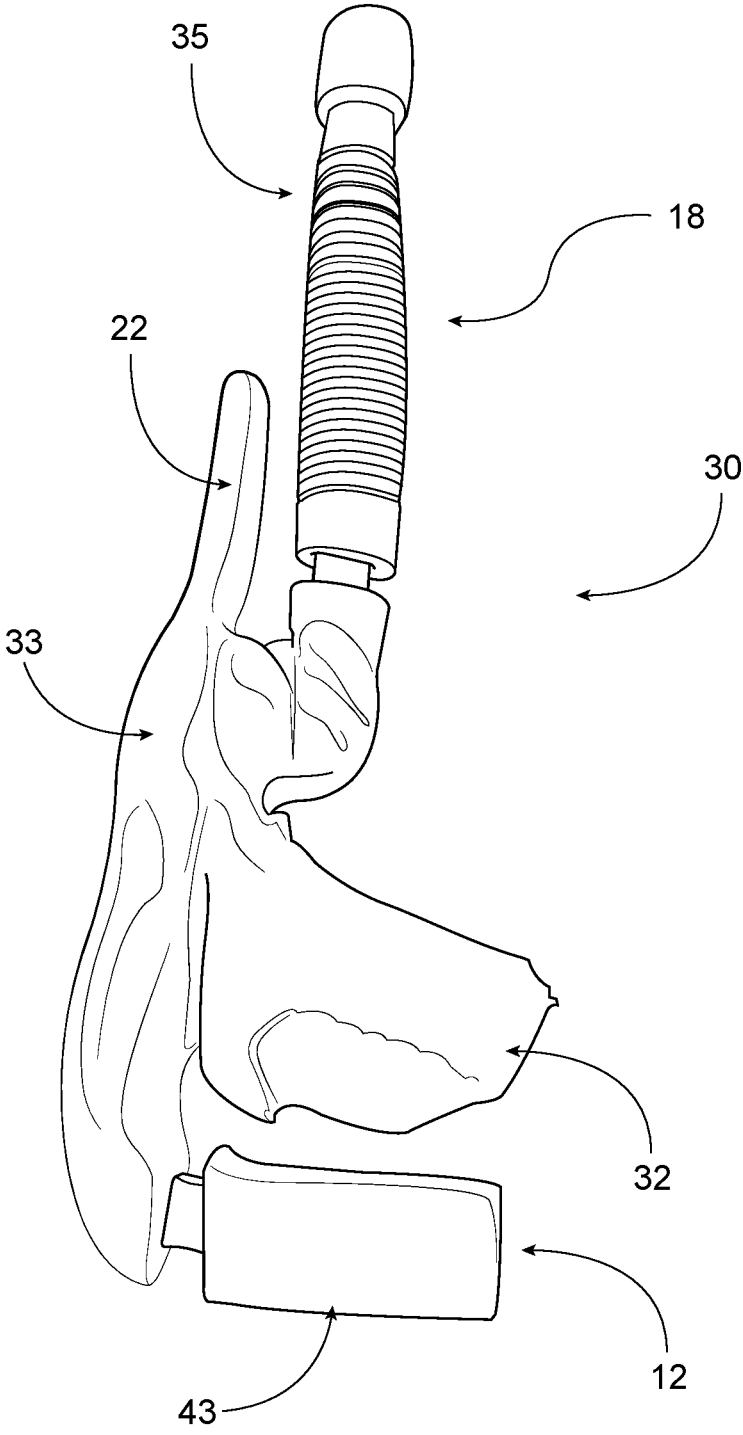
FIG. 3B is a plan view of a core according to embodiments.
Figure 3C:
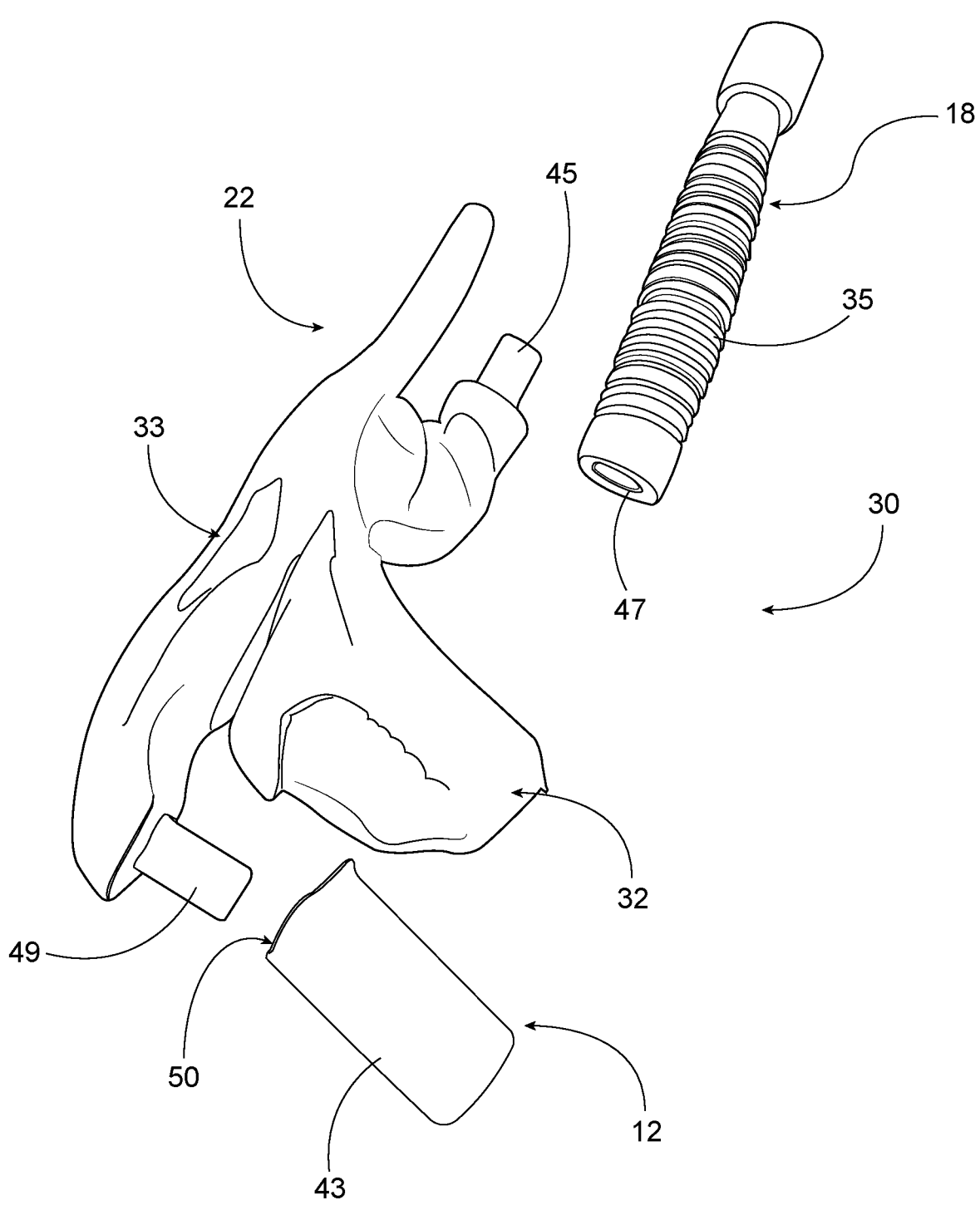
FIG. 3C is a plan view of a core according to embodiments.

In embodiments, the part of the core that forms the nasal passage 12 is separable from the part of the core 30 shown in FIG. 3A. A separable trachea 18 is also formed, in embodiments (FIG. 3C). In this way, replacing the entire core, or only portions of it is possible. For example, in certain embodiments, the core 30 has a first port (FIG. 3A), a nasal passage portion, and a trachea portion (FIG. 3C). In other embodiments, the core 30 is formed in one piece.

The core is used in a molding apparatus, such as an injection molding apparatus. The core 30 can have one or more parts, as shown in FIGS. 3B and 3C. In embodiments, a core 30 has a first part 33 and a second part 35. The first part 33 has, for example, a shape of an upper jaw 32 and the second part has a shape of a trachea 18. In embodiments, the first part also has a shape of an esophagus 22, larynx 36, vocal cords 38, space for forming an epiglottis 34, and/or space for forming a tongue 31. In embodiments, a third part 43 has a shape of a nasal passage 12. The second part 35 and third part 43 can be removably attachable to the first part 33. For example, the core 30 can have parts that are separately removable and replaceable. In embodiments, the one or more parts of the core are sculpted from a sculptable material. For example, one or more parts of the core is sculpted from a polymer, such as a resin material. The sculptable material can be a curable polymer. In embodiments, the sculpted cured polymeric part is used to make a mold so that the core, or parts of the core 30, are easily and efficiently replaced.

The parts of the core 30, can be glued together or attached by attachment features. The first part 33, in embodiments, has an esophagus 22, upper jaw 32, larynx 36, vocal cords 38, space for forming a tongue 31, and space for forming an epiglottis 34, as seen in FIGS. 3A-3C. The second part 35 has a shape of a trachea 18. A post 45 on the first part 33 is received in a hole 47 of the second part 35 to attach the parts of the core 30 together. The first part 33 has another post 49 that is received in another hole 50 in the third part 43 to attach those parts together.

In embodiments, the core 30, one or more parts of the core 30, is sculpted by hand. However, the core or part of the core can be made by 3-D printing, stereo lithography, and/or techniques using computer data or models. In embodiments, the core 30 has a third part 43 that has a shape of a nasal passage 12. The third part 43 can be removably attached to the first part 33.

In embodiments, the first part 33 includes the shape of the uvula 26. In embodiments, the uvula space is filled with silicone before the core is used in molding.

After the core 30 for the inner portion of the mold is sculpted in resin or polymeric curable material, the material of the core is allowed to cure. The core is the interior portion of the mold and is placed in an exterior portion of the mold. In embodiments, the exterior portion of the mold is formed from fiberglass. In embodiments, the exterior portion of the mold is a multi-part fiberglass mold 41 that is assembled together such as with bolts 42 (see FIG. 6). For example, the multi-part mold may have four parts bolted together.

Figure 5:
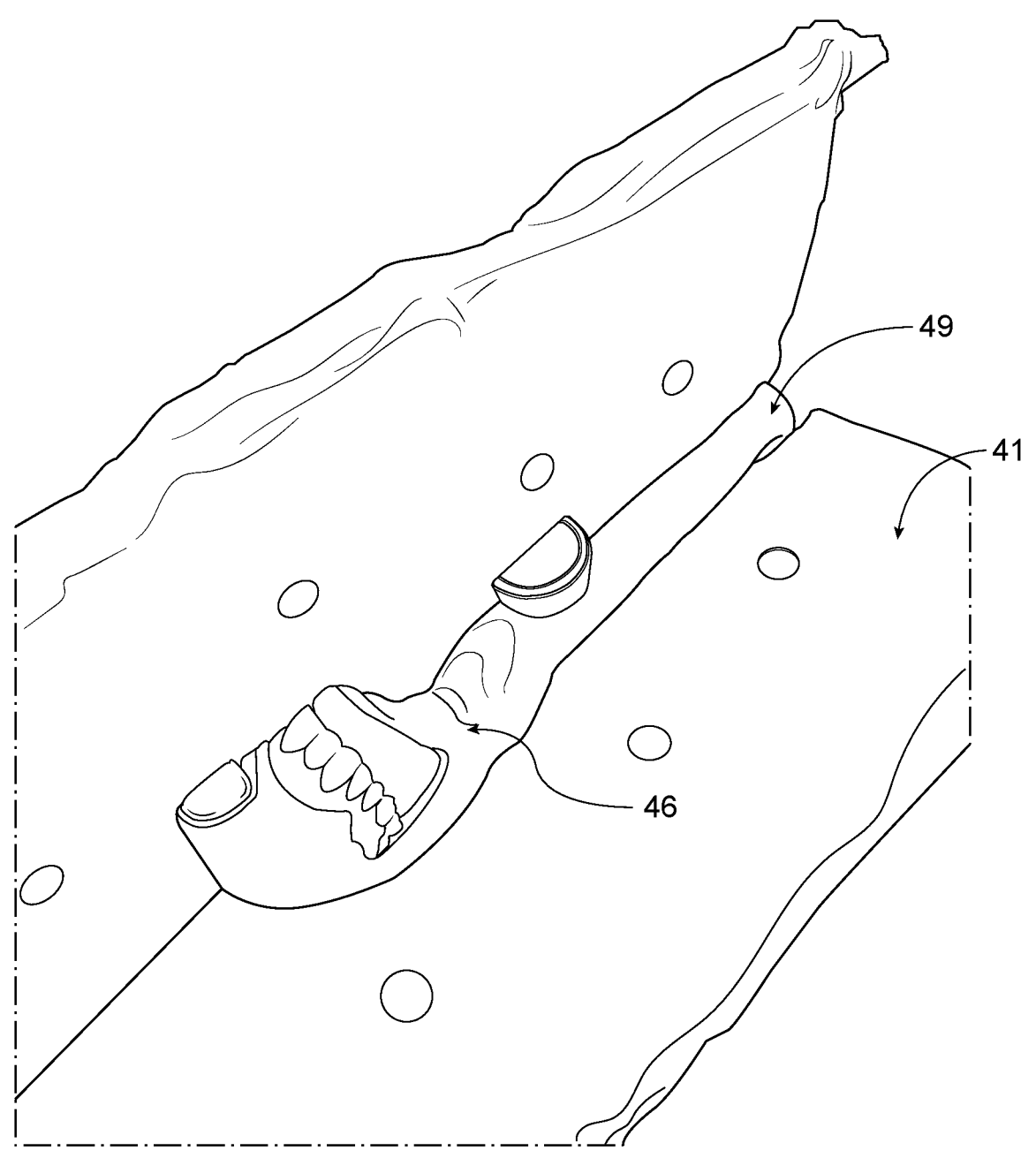
FIG. 5 is a perspective view of the interior of a mold showing the core therein, in accordance with embodiments.

To create the mold, the core 30 is coated with clay 46, sculpting wax, or other sculptable material. As shown in FIG. 5, the clay 46 is layered onto the core 30 and the core 30 is used to create the initial mold 41. For example, an oil-based clay called Monster Clay can be used. The clay 46 enables the sculptor of the clay to create different thicknesses for the tissue in different regions of the airway 10. For example, a section that backs onto the epiglottis 34 is thicker so that it is stronger and can withstand pressure from a laryngoscope during use.

Prior to casting, the clay 46 is removed such as, for example, melting away the clay layer. In embodiments, the layer of clay is melted, dissolved, or rinsed away. Thus, this layer is a sculptable layer of material that is not cured and can be removed. The clay layer and its removal forms the negative space into which polymeric material is injected. For example, the mold is injected with Platsil GelO0 (a silicone material) to cast the airway 10.

The mold is created by fibreglassing over the core. In embodiments, the clay or other sculptable material is then melted away from the mold permanently. This leaves a negative void which is the space the silicone or other curable polymeric material is introduced into to create the airway. In embodiments, the airway 10 is injection molded. In embodiments, the mold 41 has a gate 49 into which the silicone or other plastic material is injected. The mold can be a single or multi-cavity mold, for forming multiple simulated airways during the injection molding process. In multi-cavity molds, the polymer is injected into a runner that leads to multiple gates of the cavities. A core would be disposed in each cavity, and an airway would be formed in each cavity.

Other structures, such as ligament and/or cartilage structures, can be formed between the core and the clay. For example, the thyroid cartilage, cricoid cartilage, vocal ligament, and/or tracheal cartilage may be shaped. These structures can help a medical professional distinguish the esophagus from the trachea.

Figure 4:
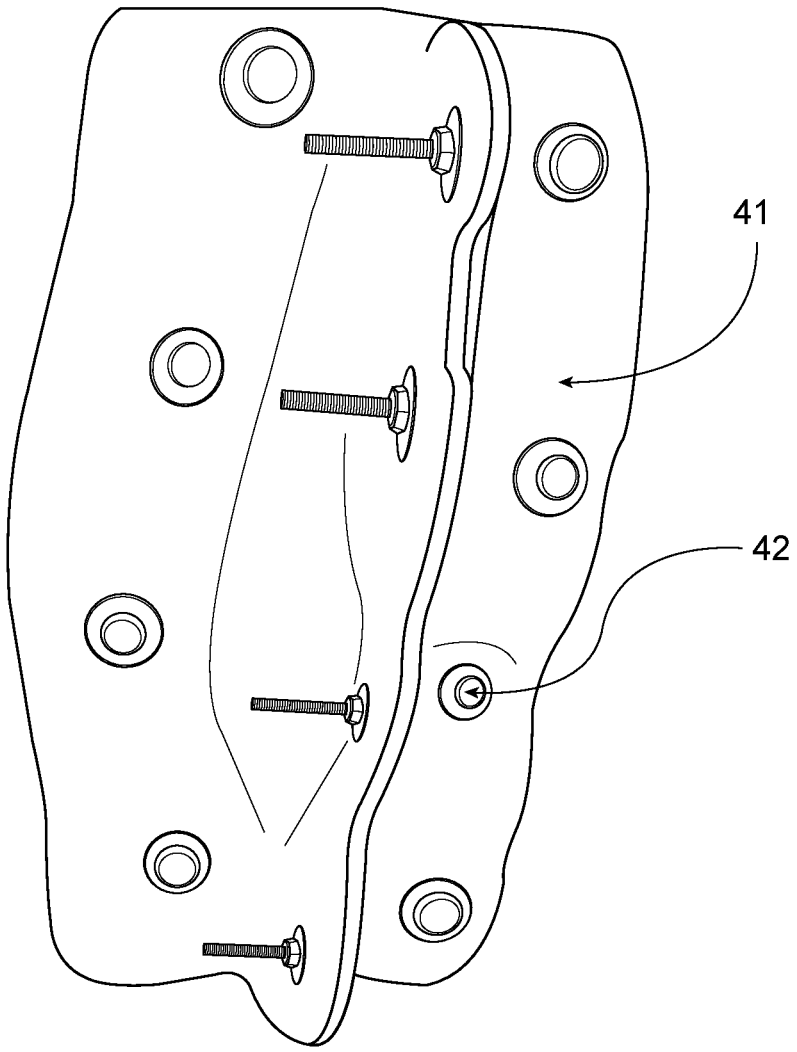
FIG. 4 is a front perspective view of a simulated tongue in accordance with certain embodiments.

In embodiments, the sections of the fiberglass mold are coated in Platsil Gel 00 (a silicone material) and then fabric is applied inside to act as reinforcements before the core 30 is placed inside the mold 41 and the multi-part mold is closed. In embodiments, the fabric is nude full body stocking. FIG. 4 shows the multi-part mold being bolted together.

Figure 6:
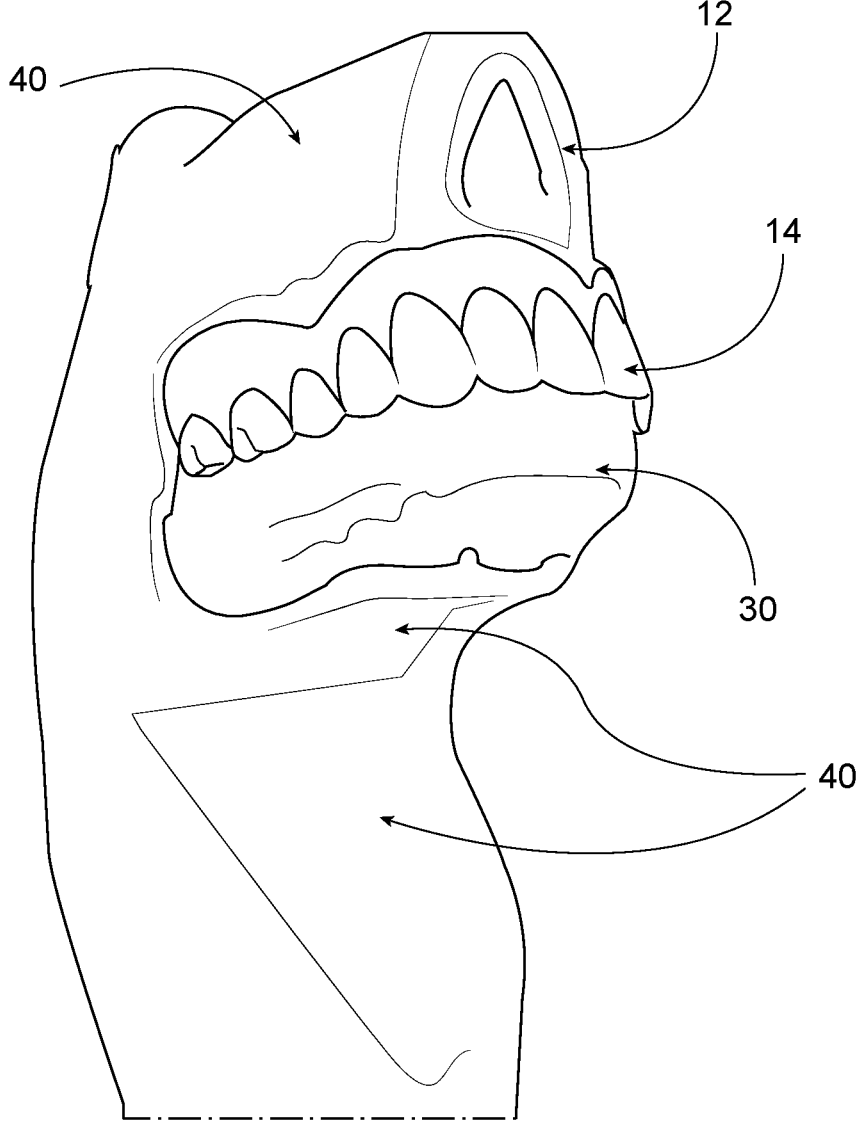
FIG. 6 is a front perspective view of a fiberglass mold in accordance with certain embodiments.
Figure 7:
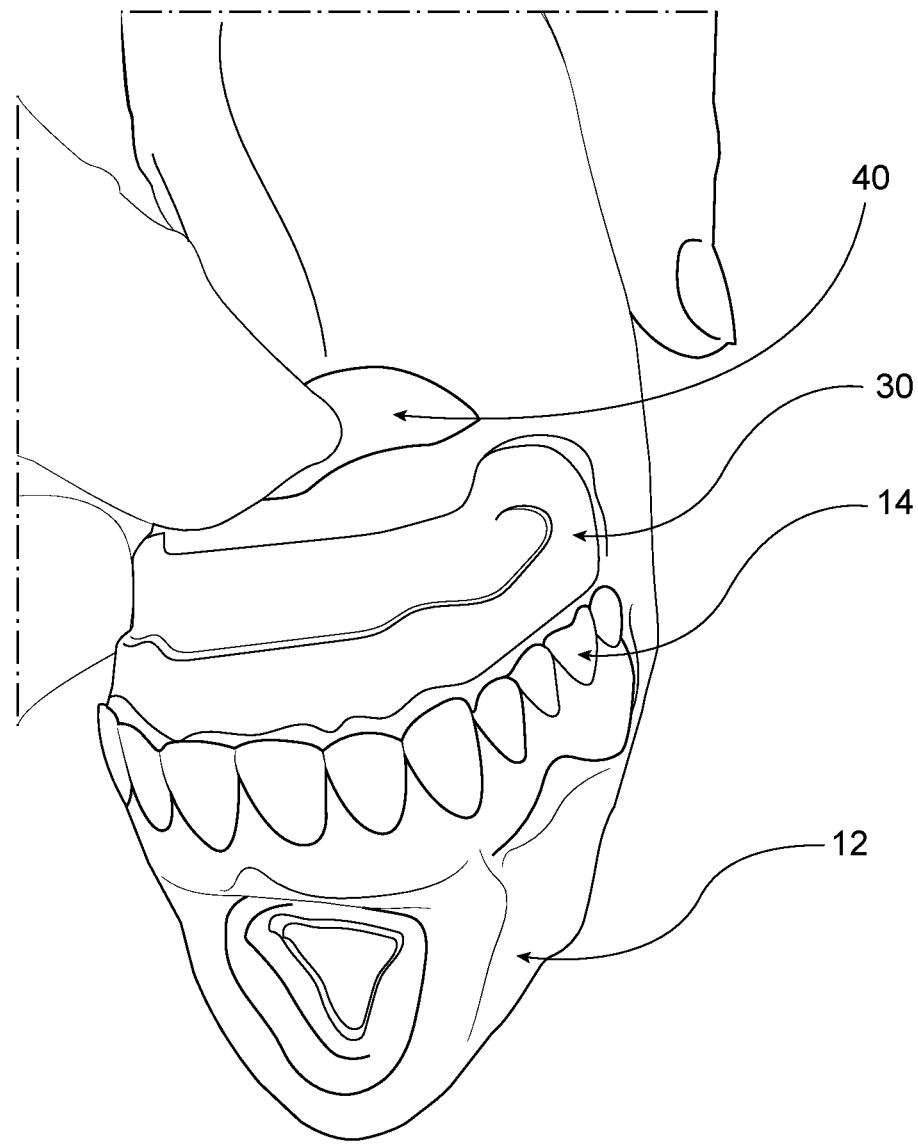
FIG. 7 is a bottom perspective view of the airway and core in accordance with certain embodiments.

Once the silicone has cured, the airway is then de-molded but left on the core 30 (see FIGS. 6 and 7). In other words, the fiberglass exterior portion of the mold 41 is removed but the inner core 30 is left in place. FIG. 6 shows the de-molded airway still on the core 30, with the nasal passageway 12 formed and teeth 14 attached. In embodiments, fabric 40 is used to reinforce the following sections: the upper nasal passage 12, the section parallel to the epiglottis 34, and the tongue 16 (see FIGS. 6 and 7). In embodiments, these sections are brushed with Platsil Gel 10 and are cured in hot water tanks. In embodiments, the fabric is stretch body netting mesh.

Figure 8:
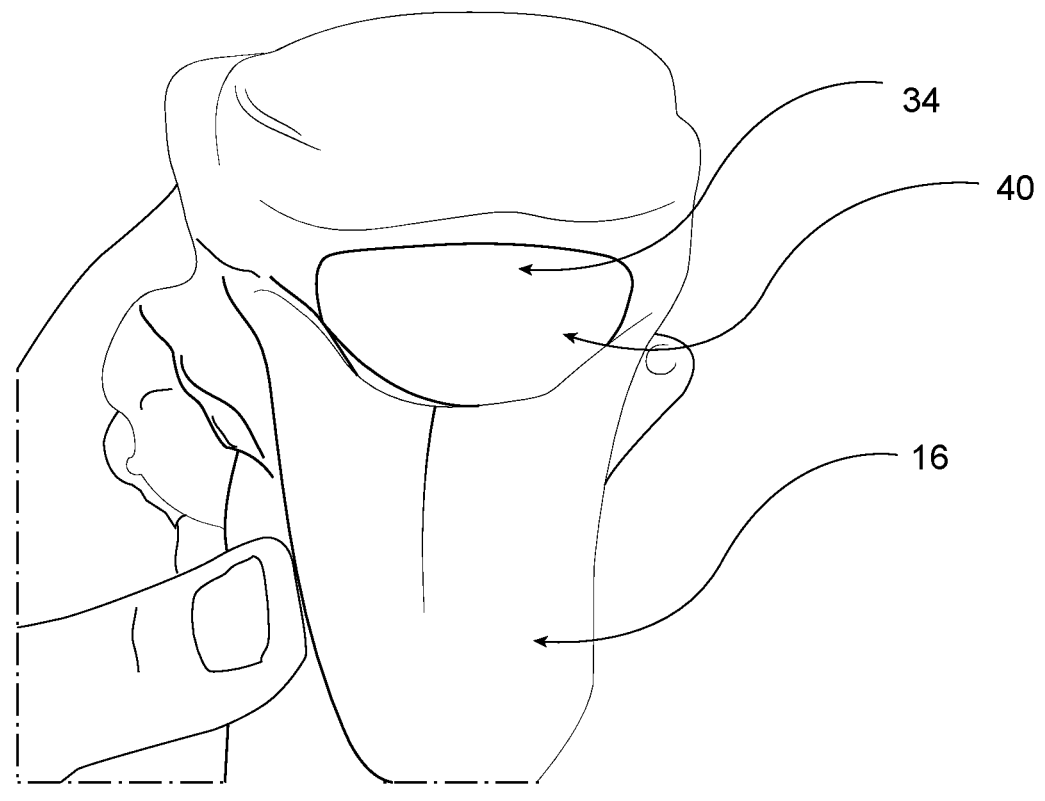
FIG. 8 is a side perspective view of a simulated airway and core in accordance with embodiments.

FIG. 8 shows a simulated tongue 16. The tongue 16 is attached to the core and casts as one piece with the rest of the airway. The simulated tongue 16, in certain embodiments, is made from a silicone material. In an example, the tongue 16 can have an outer layer of a silicone material that has an interior injected with a silicone material of a different durometer. The epiglottis 34, tongue 16, and fabric reinforcement 40 is shown in FIG. 8. In embodiments, the fabric is stretch body netting mesh. In embodiments, the epiglottis 34 is a flap attached to the tongue 16 and provided as part of that structure, placed in the mold prior to introducing the polymer or attached after molding. In other embodiments, the epiglottis is formed during the injection molding or other molding process. For example, as shown in FIG. 3A, the space for molding the tongue 31 and epiglottis 34 is formed on the core 30 and the tongue and epiglottis is formed during molding.

As shown in FIGS. 6 and 7, the tongue 16, as well as underside of the epiglottis 34 and nasal passage 12, is reinforced with fabric 40.

Figure 9:
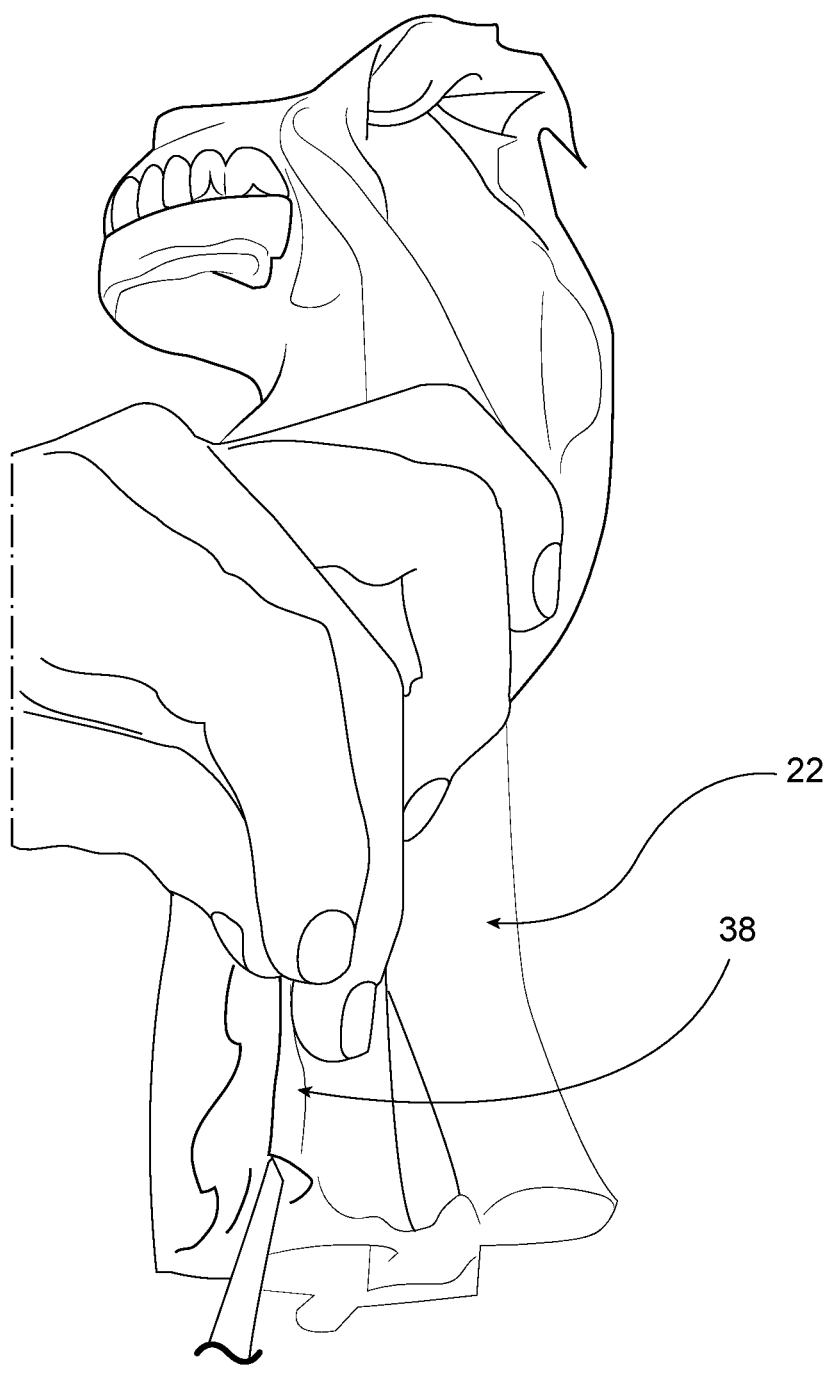
FIG. 9 is a plan view of the simulated airway in accordance with embodiments.

The airway 10 is then de-molded from the core. The airway is folded open and vocal cords 26 are painted or otherwise illustrated. In embodiments, the shape of the vocal cords is formed during the molding process and the vocal cords are painted or depicted using colored silicone. For example, the vocal cords can be painted with Platsil Gel 10. FIG. 9 shows the trachea 18, esophagus 22, and vocal cords

Figure 10:
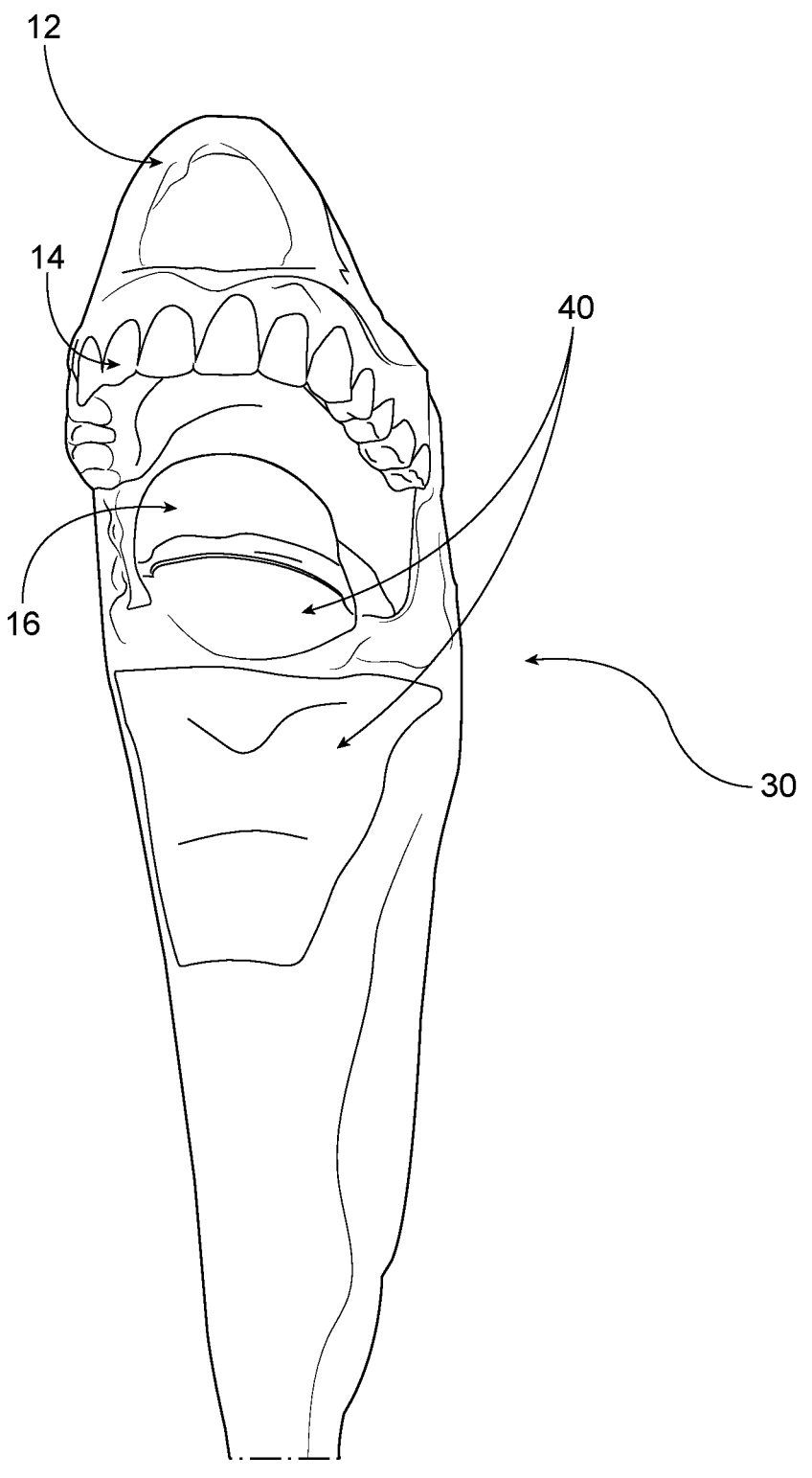
FIG. 10 is a plan view of the airway after being removed from the core.

38. The inside is then coated in Platsil 10 which has red flocking or tiny fibers added to the silicone material to provide a desired texture. The completed airway 10 is shown in FIG. 10.

In certain embodiments, portions of the core are separable and separately replaceable. In embodiments, the trachea portion of the core is provided as a separate removable part that can be replaced. In embodiments, the nasal passage portion of the core is a separate removable part that can be replaced. In embodiments, a separate, articulatable lower jaw can be attached to the simulated airway 10.

In certain embodiments, a mold is formed from the core so that replacements can be made efficiently. To make a replacement core 30, the mold is used to cast a new core using a polymeric material such as a polyurethane resin. An example of a suitable polyurethane resin is Axson F180. In embodiments, parts of the simulated airway are made by 3-D printing, or computer model.

In certain embodiments, further structures are made and the simulated airway 10 is incorporated with these other structures. For example, the simulated airway can be combined with a head, chest or other simulated structures for a more complete manikin. In other embodiments, the airway is provided in a frame suitable for simulations and practice.

In aspects, a method of making a simulated airway 10 includes using an insert mold having a core 30 and an outer portion 41. The core is sculpted from a sculptable polymeric material to from the shape of the interior surface of the airway. For example, the sculptable polymeric material may be a resin. The shape of certain anatomical structures are formed in the sculpting process. The sculptable material can be sculpted by hand. In embodiments, the space for the uvula is pre-filled with silicone to avoid collecting bubbles during molding. During sculpting, the shape of certain structures is formed. For example, the shape of the larynx can be formed. In embodiments, the upper jaw 32, epiglottis 34 (or the negative space for the epiglottis), larynx 36, and vocal cords are formed. In embodiments, the shape of the tongue 31 is formed on the core 30. In embodiments, simulated teeth are attached to the core 30 before molding. In embodiments, a separate part of the core is shaped for the nasal passage 14. For example, the separate part of the core 30 for the nasal passage 14 is removable and replaceable. A separate part of the core for the trachea can be formed. For example, the trachea part of the core 30 can be removable and replaceable. The outer portion of the mold, in embodiments, is a multi-part mold. For example, it can be a multi-part, such as a four-part, fiberglass mold 41.

In methods of making a simulated airway according to some embodiments, the core 30 is used to create the mold 41 and coated with clay or other sculptable material 46. For example, the clay or other sculptable material can be shaped to form portions of different thickness during molding. In embodiments, the clay or other sculptable material can be shaped to form thicker portions for a section that backs onto the epiglottis 34. In embodiments, the clay is removed by melting, rinsing, or dissolving the clay. In embodiments, the airway 10 is injection molded. The outer portion of the mold 41, or portions of it, can be coated in silicone and reinforced with fabric prior to molding. Other structures may be formed in the mold, such as ligament and/or cartilage structures. In embodiments, silicone is introduced into the mold and cured. In embodiments, the airway is removed from the outer portion of the mold 41 but left on the core 30. Fabric may be used to reinforce one or more of the following: the upper nasal passage 12, the section parallel to the epiglottis 34, and the tongue 16. In embodiments, one or more of these sections is coated with silicone and cured. For example, they may be cured in a hot water bath. For example, the fabric can be netting or mesh. For example, the fabric can be stretch body netting mesh. In embodiments, the space for the epiglottis and tongue is formed on the core. In embodiments, the space for the epiglottis and tongue is formed on the core and the epiglottis, tongue and/or trachea are formed integrally during molding. The airway 10 is removed from the core. In embodiments, the airway is folded open and vocal cords are depicted. For example, the vocal cords can be painted or coated in a colored silicone material. In embodiments, the inside of the airway 10 is coated in silicone that includes fibers. For example, the airway can be coated with silicone having red flocking. In embodiments, the airway 10 is incorporated with other structures. For example, the airway 10 can be incorporated with a simulated head and/or chest.

In further aspects, a method of making a simulated airway 10 comprises sculpting a core 30 in a shape of an interior surface of an airway including a larynx 36, a tongue 16, and an epiglottis 34. A layer of material 46 is deposited on the core 30. The core 30 is placed in a mold 41. The layer of material 46 is removed. A polymer is introduced into the mold 41. The polymer is cured. In embodiments, the polymer is silicone. The core can be sculpted from a resin material, for example. The core can have a shape of a trachea 18.

In embodiments, the trachea 18, tongue 16, and epiglottis 34 are integrally formed from the polymer during the molding process. The method of making the simulated airway 10 can include reinforcing portions with fabric 40. For example, the fabric 40 is netting mesh. In embodiments, at least a portion of the tongue 16 is reinforced with fabric. In embodiments, at least a portion of the tongue 16, an area adjacent the epiglottis 34, and at least a portion of a nasal passage 12 are reinforced with fabric such as netting mesh. In embodiments, portions are reinforced with fabric 40 while the airway 10 is disposed on the core 30. The fabric 40 may be brushed with silicone. The silicone can be cured in a hot water bath.

In embodiments, vocal cords 38 are depicted inside the simulated airway. In embodiments, the simulated airway 10 is folded open and vocal cords 38 are depicted inside the simulated airway. For example, the vocal cords 38 are painted. In another example, the vocal cords 38 are coated in colored silicone.

The method of making the simulated airway 10 can include removing the simulated airway from the core 30. Before the molding process, a simulated set of teeth are attached to the core, in embodiments.

In embodiments, the layer of material deposited on the core 30 is a layer of clay 46. The layer of clay 46 is sculpted to have a thicker area, in some embodiments. The layer of material 46 is removed, for example, by melting.

In embodiments, the core 30 is made so that it has more than one part. For example, the core has at least two parts, removably attached to each other. In embodiments, the core has a shape of a nasal passage 12. In embodiments, part of the core has a shape of a nasal passage and is removable and replaceable. In embodiments, the core 30 is made in three parts, a first part 33, a second part 35, and a third part 43. For example, the first part 33 is attached to the second part 35, and the first part is also attached to the third part 43. In embodiments, the first part 33 has a post 45 and another post 49. The second part 35 has a hole 47 for receiving post 45 and the third part 43 has a hole 50 for receiving post 49, as shown in FIG. 3C.

In embodiments, the simulated airway 10 is incorporated in a manikin. The simulated airway is combined with a simulated head, for example, and/or is combined with a simulated chest.

The method of making the simulated airway 10 can include filling a space for the uvula with silicone before the core is used in molding.

In another aspect, a method of making a simulated airway 10 comprises sculpting a core 30 from a resin to approximate a shape of an interior surface of an airway, the shape of the interior surface of the airway including a nasal passage 12, a larynx 36, and a tongue 16. A layer of clay 46 is deposited on the core 30. The core is placed in a mold 41. The layer of clay 46 is removed. A polymer is introduced into the mold 41 and the polymer is cured. At least an upper portion of the nasal passage 2 and a portion of the tongue 16 is reinforced with a fabric. The simulated airway is removed from the core. Vocal cords are illustrated inside the simulated airway.

In embodiments, a core 30 is sculpted from a resin to approximate a shape of an interior surface of an airway, the shape of the interior surface of the airway including a nasal passage 12, a larynx 36, and a tongue 16. A layer of clay 46 is deposited on the core 30. The layer of clay is sculpted to have a surface in a desired shape. The core and clay surface are used to form a fiberglass mold. The layer of clay 46 is removed. A polymer is introduced into the mold 41 and the polymer is cured. At least an upper portion of the nasal passage 12 and a portion of the tongue 16 is reinforced with a fabric. The simulated airway is removed from the core. Vocal cords are illustrated inside the simulated airway. In embodiments, the core is sculpted to include the shape of various anatomical features. The various anatomical features can include the larynx 36, the tongue 16, the epiglottis 34, and/or the nasal passage 12.

The method of making a simulated airway 10 can include brushing areas with silicone material and curing in a hot water bath. In embodiments, a simulated set of teeth 14 are attached to the core 30. For example, the set of teeth are attached before introducing the polymer.

In embodiments, the clay 46 is an oil-based clay. The clay may be removed by melting.

The method of making a simulated airway 10 can include making the core 30 in more than one part. The one or more portions of the core 30 can be separately replaceable. In embodiments, the fabric 40 is applied while the airway remains on the core 30. In embodiments, the molded airway 10 is removed from the core 30 before the vocal cords 38 are depicted.

What is claimed is:

1. A method of making a simulated airway, comprising:
sculpting a core from a resin to approximate a shape of an interior surface of an airway, the shape of the interior surface of the airway including a nasal passage, a larynx, and a tongue, the core being sculpted to include the shape of the larynx and tongue;
depositing a layer of clay on the core;
placing the core in a mold;
removing the layer of clay;
injecting a polymer into the mold and curing the polymer;
reinforcing at least an upper portion of the nasal passage and a portion of the tongue with a fabric;
removing the simulated airway from the core; and
illustrating vocal cords inside the simulated airway.

2. The method of claim 1, wherein the core is sculpted to include the shape of an epiglottis.

3. The method of claim 1, wherein the core is sculpted to include the shape of the nasal passage.

4. The method of claim 1, further comprising brushing areas with silicone material and curing in a hot water bath.

5. The method of claim 1, further comprising attaching a set of teeth.

6. The method of claim 5, wherein the set of teeth are attached before injecting the polymer.

7. The method of claim 1, wherein the clay is an oil-based clay.

8. The method of claim 1, wherein the clay is removed by melting.

9. The method of claim 1, wherein one or more portions of the core are separately replaceable.

10. The method of claim 1, further comprising attaching simulated teeth to the core before placing the core in the mold.

11. The method according to claim 1, wherein the molded airway is removed from the core before the vocal cords are depicted.

12. The method according to claim 10, wherein the fabric is applied while the airway remains on the core.

* * * * *